3,095,759
COMBINATION TRANSMISSION AND
DIFFERENTIAL
J. T. Herrod, 606 B St., Taft, Calif.
Filed Mar. 31, 1961, Ser. No. 99,814
1 Claim. (Cl. 74—701)

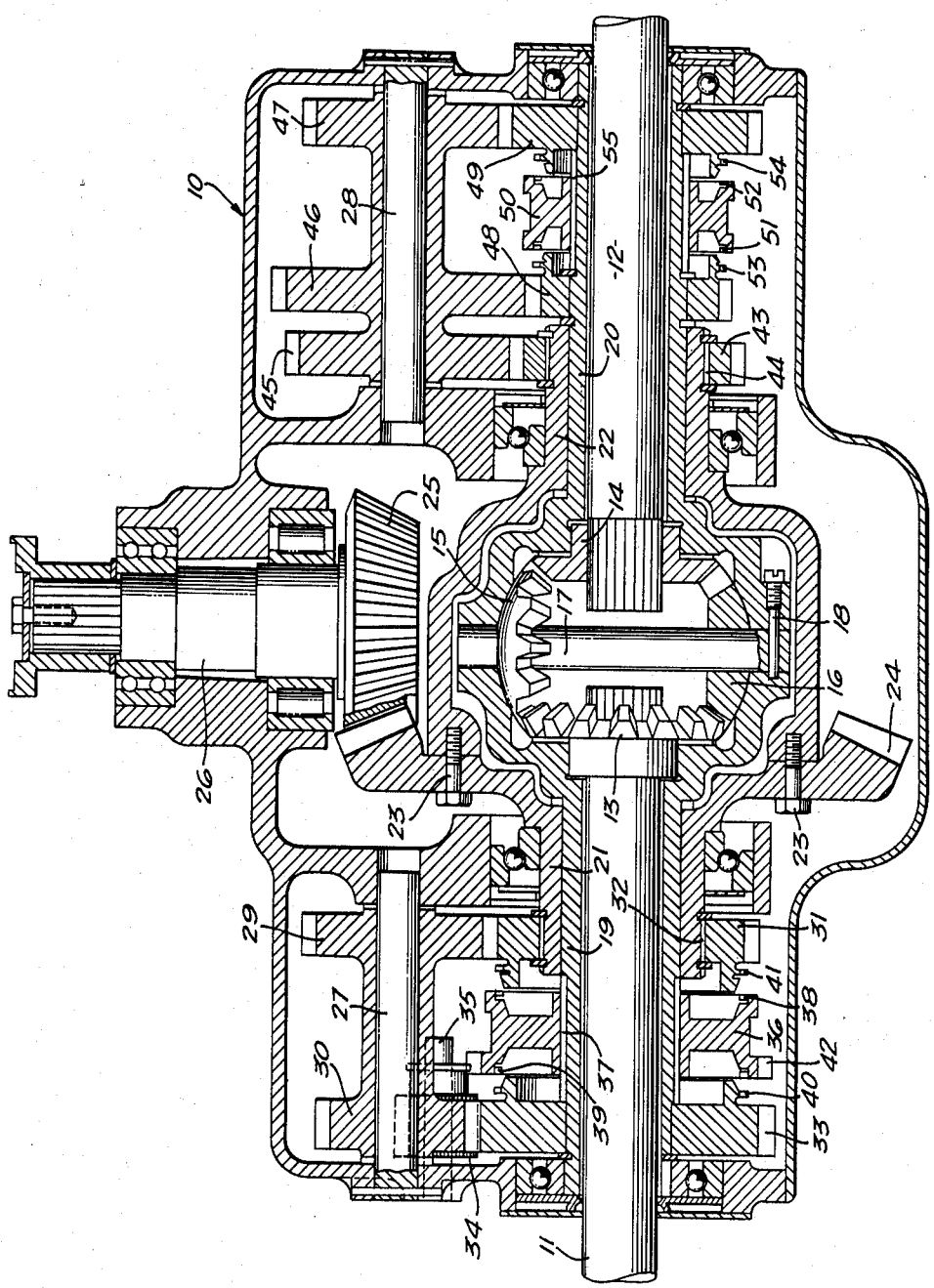

This invention relates to a combined differential and transmission for motor-driven vehicles.

An object of the invention is to provide an improved arrangement of a speed-change transmission and differential gearing which is highly compact, neatly arranged, and which has an important advantage of having the gears of the speed-change transmission engage and disengage at low speeds or speeds more closely approaching axle speed than in the conventional speed-change transmission.

With the foregoing and other objects in view, which will be made manifest in the following detailed description and specifically pointed out in the appended claim, reference is had to the accompanying drawing for an illustrative embodiment of the invention, wherein:

The FIGURE is a longitudinal section through one form of combined differential and speed-change transmission embodying the present invention.

Referring to the accompanying drawing wherein similar reference characters designate similar parts throughout, within a suitable housing 10 there are two aligned axles 11 and 12. These axles may be the rear and driving axles of a power-driven motor vehicle although they may be front axles if the invention is incorporated in a vehicle having a front wheel drive.

The inner ends of the axles are operatively coupled together by differential gearing shown as consisting of miter gears 13 and 14 which are in mesh with miter gears 15 and 16. The miter gears 15 and 16 are shown as being rotatable upon a diametrically extending pin 17 that is pinned in place as at 18. Only two miter gears 15 and 16 have been illustrated and these are shown as being diametrically opposed to each other. However, it will be appreciated that additional miter gears may be employed if desired between the miter gears 13 and 14 which are on the axles.

Sleeves 19 and 20 surround the axles 11 and 12 within the housing 10 and may be coupled together into a unitary structure on a circumference that includes the diametrical pin 17. These sleeves on being rotated will carry with them the miter gears 15 and 16, thus rotating the axles 11 and 12 but at the same time permit of rotation of one axle relative to the other in the same manner that is afforded by conventional differential gearing.

Surrounding the sleeves 19 and 20 there are outer or secondary sleeves 21 and 22 which may be fastened together as at 23 into a unitary sleeve structure. The sleeve 21 may have integral therewith or secured thereto a ring gear 24 that is in mesh with pinion 25 on a drive shaft 26 that is rotated by any suitable source of power. Usually the drive shaft 26 will be arranged at right angles to the axes of the axles 11 and 12 but such an arrangement is not essential to the present invention. Other means of driving the outer or secondary sleeves 21 and 22 may be employed if desired.

Between the secondary sleeves 21 and 22 and the primary sleeves 19 and 20 there is arranged a speed-change transmission illustrated as consisting of two countershafts 27 and 28 arranged on opposite sides of the differential gearing and parallel to the axles 11 and 12.

On the countershaft 27 there is countershaft gearing consisting of two gears 29 and 30 either integral with each other or firmly secured together so as to rotate in unison. Gear 29 is in constant mesh with a gear 31 which is keyed or otherwise rigidly secured to the secondary sleeve 21 such as by a key or spline 32. The gear 30 is in constant mesh with a gear 33 which is rotatable on the sleeve 19. This gear also meshes with a reversing pinion 34 that is slidable on a stub shaft 35. A gear selector 36 is splined or feathered on the sleeve 19 such as by the feather 37. This gear selector is adapted to be axially shifted relative to the sleeve 19 so that its clutch elements 38 and 39 may be caused to optionally engage the corresponding clutch elements 40 and 41 on the gears 31 and 33, respectively. Shifting forks or any equivalent mechanism, not shown, may be used to axially shift the selector 36 either to the right or to the left from the neutral position shown. When the selector 36 is shifted to the right from the position shown to engage the clutch elements 41 on the gear 31 a direct drive is established between the gear 24, sleeve 19 and sleeve 20, and sleeve 21 and sleeve 22. In this position the transmission may be regarded as being in high gear. If the selector 36 is moved to the left from the position shown to engage clutch elements 39 and 40 the drive from drive shaft 26 is through sleeve 21, gear 31, gears 29 and 30, gear 33, and selector 36 to the sleeve 19. In this position the transmission may be regarded as being in a lower gear depending upon the relative sizes of gears 29, 30, and 33. If the selector 36 is left in the neutral position shown and the reversing pinion 34 is axially shifted on its stub shaft 35 to engage gear teeth 42 on the selector, the sleeve 19 will be driven in a reverse direction from the gear 31 through gear 29, gear 30, pinion 34 and selector 36.

On the sleeve 22 there is likewise a gear 43 which is keyed or splined to the sleeve as at 44. This meshes with a gear 45 or countershaft gearing on the countershaft 28 and drives countershaft gears 46 and 47. Gear 46 meshes with gear 48 that is rotatable on the sleeve 20 and gear 47 meshes with gear 49 that is likewise rotatable on sleeve 20. Gear selector 50 is interposed between the gears 48 and 49 and has clutch elements 51 and 52 engageable with complementary clutch elements 53 and 54 on the gears 48 and 49, respectively. The selector 50 is feathered to the sleeve 20 by a feather 55 and is adapted to be axially shifted relative to the sleeve 20 by shifter forks or equivalent mechanism, not shown. When shifted to the left of the neutral position shown it serves to lock gear 48 against rotation relative to the sleeve 20 so that the drive from drive shaft 26 is through sleeve 22, gear 43, gear 45, gear 46, gear 48, and selector 50. When the selector 50 is moved to the right of the neutral position shown the drive from drive shaft 26 is through sleeve 22, gear 43, gear 45, gear 47, gear 49, and selector 50.

Anti-friction bearings, seals and the like may be employed as illustrated but have not been described in detail as they are of secondary importance insofar as the present invention is concerned. In accordance with the present invention at least some of the gears of the speed-change transmission are disposed in surrounding relationship relative to the axles which are driven thereby so that the space surrounding the axles is advantageously used in the interests of compactness.

An important advantage of the present construction is that the speed-change transmission is located between the ring gear 24 and the differential gearing between the axles. Almost invariably in a particular transmission of this character the ring gear 24 is of a diameter materially greater than the diameter of the pinion 25 so that the speed of rotation of the ring gear is but a small proportion of the speed of rotation of the drive shaft 26. By arranging the gears of the speed-change transmission between the ring gear 24 and the differential a speed-change reduction has already occurred between the pinion 25 and the ring gear with the result that the gears of the speed-change transmission are driven at lower speeds and at speeds more closely approaching the speed of rotation of the axles 11 and 12. By having the gears of the speed-change transmission rotate at speeds more closely approaching axle speed shifting of the gears of the speed-change transmission is facilitated.

In the construction illustrated in the figure, the speed-change transmission has been illustrated in a manner in which it may be regarded as having been equally distributed on both sides of the differential gearing.

It will be appreciated from the above-described construction that the improved combined speed-change transmission and differential can be easily and economically manufactured and assembled, that the parts thereof may be ruggedly constructed, and that the parts when operated will normally be required to turn at relatively low speeds as compared with speed-change transmissions located between the pinion 25 and the power source.

As the drive shaft 26, the ring gear 24, and sleeve 21 are only required to carry or transmit the full torque of the engine that normally drives the drive shaft 26, these parts can be made of much lighter construction that is normally required when a speed-change transmission is interposed between the engine and the differential. It will be appreciated that the improved combined transmission and differential can be equally adapted to automatic torque converter-type transmissions.

Various changes may be made in the details of construction without departing from the spirit and scope of the invention as defined by the appended claim, wherein.

I claim:

In combination, two aligned axles having differential gearing therebetween, sleeve means rotatable about said axles and operatively connected to the differential gearing so as to drive the same, countershafts arranged parallel to said axles on opposite sides of the differential gearing, countershaft gearing on said countershafts, gears rotatable on said sleeve means meshing with the countershaft gearing, means for selectively locking said gears against rotation relative to the sleeve means, a second sleeve means rotatable about said first sleeve means, gears keyed on the second sleeve means meshing with the countershaft gearing on the countershafts so as to drive the same, and means for driving the second sleeve means.

References Cited in the file of this patent

UNITED STATES PATENTS

| | | |
|---|---|---|
| 2,576,478 | Beckwith | Nov. 27, 1951 |
| 2,666,337 | Brownyer | Jan. 29, 1954 |
| 2,858,714 | Black | Nov. 4, 1958 |

FOREIGN PATENTS

| | | |
|---|---|---|
| 28,327 | Great Britain | Dec. 16, 1911 |